United States Patent [19]

Thurner

[11] Patent Number: 4,802,802
[45] Date of Patent: Feb. 7, 1989

[54] ATTACHMENT UNIT INCLUDING NAIL AND SLEEVE

[75] Inventor: Elmar Thurner, Feldkirch, Austria

[73] Assignee: Hilti Aktiengesellschaft, Fürstentum Liechtenstein, Fed. Rep. of Germany

[21] Appl. No.: 164,823

[22] Filed: Mar. 7, 1988

[30] Foreign Application Priority Data

Mar. 7, 1987 [DE] Fed. Rep. of Germany ....... 3707424

[51] Int. Cl.⁴ .......................... F16B 39/00; F16B 5/02
[52] U.S. Cl. ..................................... 411/107; 411/441; 411/480
[58] Field of Search ............... 411/41, 43, 103, 107, 411/372, 374, 265–270, 383, 388, 440, 441, 480, 482

[56] References Cited

U.S. PATENT DOCUMENTS

| | | | |
|---|---|---|---|
| 2,718,485 | 9/1955 | Samuely | 411/903 X |
| 3,377,903 | 4/1968 | Korte | 411/441 |
| 4,102,238 | 7/1978 | Thurner | 411/441 |

FOREIGN PATENT DOCUMENTS 3544423A 6/1987 Fed. Rep. of Germany ...... 411/107

Primary Examiner—Neill R. Wilson
Attorney, Agent, or Firm—Toren, McGeady & Associates

[57] ABSTRACT

An attachment unit is made up of a nail and a sleeve fitted onto the nail. The nail has an axially elongated shank with a head at one end. The sleeve has a first axially extending section followed by a second axially extending section with the second section located closer to the head. A flange is located at the end of the first sleeve section spaced from the second sleeve section. An exterior thread with a root diameter is formed on the first sleeve section. The second sleeve section has a outside diameter smaller than the root diameter of the thread. When the nail is driven into a receiving material, its head runs into and laterally deforms the second sleeve section. After the nail is driven in, a nut can be placed over the second sleeve section and threaded onto the exterior thread.

6 Claims, 1 Drawing Sheet

ATTACHMENT UNIT INCLUDING NAIL AND SLEEVE

BACKGROUND OF THE INVENTION

The present invention is directed to an attachment unit made up of a nail and a sleeve displaceably guided on the shank of the nail. The sleeve is axially elongated and has a first section with an abutment flange at one end and an external thread with the flange located at the end of the sleeve spaced furthest from the head of the nail.

Use of a threaded bolt drivable by an explosive powder charge has been found to be particularly economical for the removable attachment of objects to a support or receiving material into which the bolt is driven. Threaded bolts usually include a shank ending in a tip with an axially extending section of the shank having an external thread at a location spaced from the tip. After driving the shank of the bolt into the receiving material, the object provided with a bore for receiving the axially extending section of the bolt with the external thread is placed on and clamped to the receiving material by threading a nut onto the threaded section.

One problem experienced with such threaded bolts is that the tightening moment applied by the nut introduces a tensile force into the bolt and, when there is considerable tightening of the nut, can result in pulling out the bolt.

Such disadvantages do not exist in an attachment member disclosed in the British patent No. 105,560. This known attachment member is formed of a nail and a sleeve to be fixed by means of the nail. The nail has a shank with a head at one end. The sleeve is in the form of a tubular section with an external thread and an abutment flange formed on the section. The abutment flange is located at the end of the sleeve section facing away from the head of the nail. An object to be attached using the attachment member is clamped into contact with the abutment flange by threading a nut on the external thread of the sleeve section.

Adequate tightening of the nut is possible only if the sleeve section is secured against rotation along with the nut. The securing against rotation is particularly dependent on the extent the sleeve is clamped between the head of the nail and the receiving material. The force driving the nail must be selected so that an adequate securement is obtained and, at the same time, the head bearing against the sleeve does not cause deformation of the external thread, since such defomation would interfere with placing the nut on the sleeve. Such an attachment member is unsuitable for use with an explosive powder charge operated device, because of the changing condition in the receiving material the pre-established driving force would result in different depths of penetration of the nail.

SUMMARY OF THE INVENTION

Therefore, it is the primary object of the present invention to provide an attachment unit for insertion into a receiving material using an explosive powder charge with the unit made up of a nail with a head at one end and a sleeve positioned on the nail with an abutment flange located at the end of the sleeve more remote from the nail head. The sleeve has an external thread on which a nut can be threaded without impairing the anchoring of the nail in the receiving material.

In accordance with the present invention, the sleeve is axially elongated, and has a first section to which the abutment flange is secured and on which the thread is formed, and a second section extending from the first section toward the nail head with the second section having an outside diameter smaller than the root diameter of the thread.

When a nail is driven into the receiving material, the nail head deform the adjacent end of the second section affording a dependable clamping of the sleeve between the nail head and the receiving material. The pre-established driving energy afforded by the explosive powder charge drives such nails to a different depth due to variable receiving material conditions and, as a result, there is variable deformation of the second section, however, this does not result in any deformation of the external thread on the first section. A dampening effect on the action of the head entering the end of the second section can be afforded by designing the transition from the nail shank to the head with a fillet radius or a frustoconical shape. Since the outside diameter of the second section is smaller than the root diameter of the external thread, the deformed second section does not impair the ability to place the nut on the external thread.

Preferably, the wall thickness of the second section is less than the wall section of the first section. The different wall thicknesses can be achieved in a simple manner while maintaining the same inside diameter of the first and second sections. Accordingly, the resistance of the second section to deformation is smaller than that of the first section on which the external thread is formed, whereby only the second section is deformed when the nail is driven in.

The length of the second section is in the range of five to twenty times its wall thickness. This feature affords adequate deformation travel without forming any interfering bead as a result of deformation. Another feature of the invention is that the sleeve is fixed in the frictional locked manner with the shank of the nail adjacent the abutment flange end of the sleeve. Such a frictional lock serves for the advantageous cohesion of the nail and sleeve, and, in addition, assures that the sleeve does not rotate with the nut when it is screwed onto the exterior thread.

The frictional locking of the sleeve with the nail shank can be effected when the nail is driven in, because the driving action occurs at high velocity and develops sufficient frictional heat to establish soldering of the surfaces of the sleeve and the shank, particularly if a plated surface is provided on the inside surface of the sleeve adjacent the abutment flange. With such a soldering action high tightening moments of the nut can be accommodated. Since the remaining part of the first section of the sleeve adjacent the soldered end section is not connected in a friction locked manner with the nail shank, the transmission of excessive torque to the nail can be prevented while the nut is being tightened so that the anchored condition of the nail receiving material is not affected. When the nut is tightened, an increased tension load is introduced into the first section of the sleeve not connected with the nail shank in a friction locked manner and when such a tension load exceeds a predetermined value, it can result in the separation of the sleeve from the end section soldered to the nail. The separated section of the sleeve, however, continues to abut axially with the second section located around the head of the nail, whereby the object clamped against the receiving material by the nut is maintained. Further turning of the nut leads merely to a blind entrainment of the separated sleeve section.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
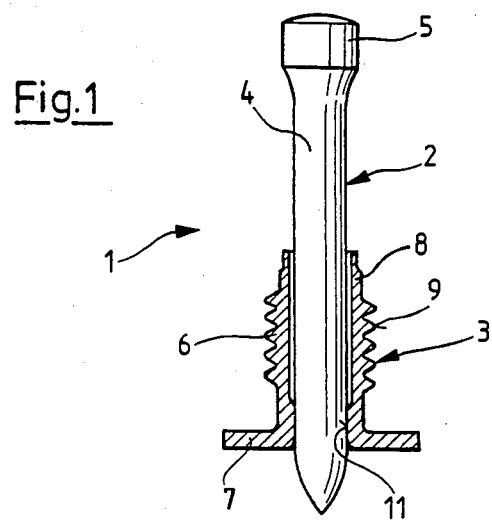
FIG. 1 is an elevational view partly in section, of a attachment unit embodying the present invention.
Figure 2:
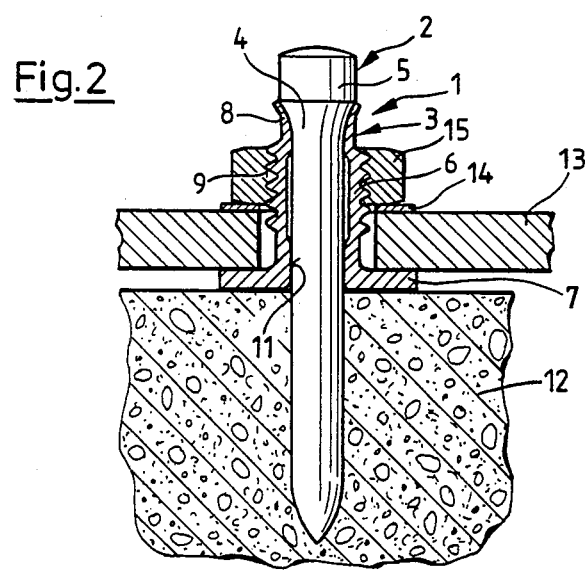
FIG. 2 is a view of the attachment member shown in FIG. 1, after being driven into a receiving material.

In FIG. 1, an attachment unit 1 is made up of an axially elongated nail 2, and an axially extending sleeve 3 encircling the forward end of the nail° Nail 2 has an axially elongated shank 4 and a head 5 at one end of the shank. The sleeve 3 is made up of a first sleeve section 6, with an abutment flange 7 formed at its front end, that is, the end furthest from the head 5 of the nail. At the opposite end of the first sleeve section 6, a second sleeve section 8 extends toward the nail head 5. The sleeve has an axial length approximately half of the axial length of the shank 4. The first sleeve section 6 has an external thread 9. The second sleeve section has an outside diameter smaller than the root diameter of the external thread. The end of the sleeve 3, adjacent the abutment flange 7, has an end region 11 in frictional engagement with the shank 4. In FIG. 2, the nail 2 is shown with its shank 4 driven into a receiving material 12. In the driving in step, the shank 4 is displaced axially through the sleeve 3 and the nail head 5 runs into the trailing end of the second sleeve section 8 towards the end of the driving step, which is effected by means an explosive powder charge. The nail head presses the sleeve against the surface of the receiving material 12, and causes an outward deformation of the trailing end of the second sleeve section 8. After the attachment unit 1 is secured to the receiving material 12, an object 13 with an opening adequate to pass over the sleeve comes into contact with the surface of the abutment flange 7. By placing a washer 14 on the outer surface of the object and threading a nut 15 on the exterior thread 9, the object can be clamped in place. It is necessary for the adequate clamping of the object 13, that the rotation of the nut 15 does not cause the sleeve 3 to turn relative to the shank 4 of the nail. This condition is assured due to the pressing action by the nail head 5 against the trailing end of the sleeve 3. Frictional engagement of the end region 11 within the sleeve 3 serves as additional security against any turning of the sleeve relative to the shank. With an appropriate surface coating of the shank and the sleeve, it is possible to solder the two parts together due to the frictional heat generated when the nail is driven in.

While specific embodiments of the invention have been shown and described in detail to illustrate the application of the inventive principles, it will be understood that the invention may be embodied otherwise without departing from such principles.

I claim:

1. Attachment unit comprising an axially elongated nail having an axially elongated shank with a head at one end of and extending transversely outwardly from said shank, and an axially extending sleeve guided on said shank so that the nail can be driven by an explosive powder charge through the sleeve into a receiving material, said sleeve comprises a first end more remote from the head of said nail and a second end, an abutment flange located at and extending transversely outwardly from the first end of said sleeve, a first axially extending sleeve section extending from said flange toward the second end of said sleeve, said first sleeve section having an axially extending exterior thread with a root diameter, wherein the improvement comprises a axially extending second sleeve section extending from the first sleeve section to the second end of said sleeve, said second sleeve section has an outside diameter smaller than the root diameter of said exterior thread, said attachment unit having a first condition before being driven into the receiving material and a second condition after it is driven into the receiving material, whereby in the first condition said second sleeve section is spaced from the head of said nail and in the second condition the head of said nail is driven into said second sleeve section and deforms said second sleeve section.

2. Attachment unit, as set forth in claim 1, wherein said second sleeve section has a wall thickness less than the wall thickness of said first sleeve section.

3. Attachment unit, as set forth in claim 1 or 2, wherein said second tubular section has an axial length in the range of five to twenty times its wall thickness.

4. Attachment unit, as set forth in claim 1 or 2, wherein said sleeve in the first condition thereof is secured adjacent said abutment flange in a friction locked manner with the shank of said nail.

5. Attachment unit, as set forth in claim 1 or 2, wherein at least one of said nail and said sleeve have a coating thereon for providing a soldering action when the nail is driven into the receiving material.

6. Attachment unit, as set forth in claim 1 or 2, wherein said nail has a transition section extending from said shank to said head with said transition section having an outwardly flaring surface to said head for effecting the deformation of said second sleeve section when the nail is driven into the receiving material.

* * * * *